United States Patent [19]

Lunardon et al.

[11] Patent Number: 5,091,437
[45] Date of Patent: Feb. 25, 1992

[54] POLYISOCYANATE COMPOSITIONS AND THEIR USE IN THE PREPARATION OF FLEXIBLE POLYURETHANE FOAMS

[75] Inventors: Gianflavio Lunardon, Padua; Bruno Gallo, Mestre, both of Italy

[73] Assignee: Montedipe S.p.A., Italy

[21] Appl. No.: 524,596

[22] Filed: May 17, 1990

[30] Foreign Application Priority Data

May 17, 1989 [IT] Italy ............................... 20541 A/89

[51] Int. Cl.$^5$ .............................................. C08G 18/14
[52] U.S. Cl. .............................. 521/159; 252/182.22
[58] Field of Search ..................... 521/159; 252/182.22

[56] References Cited

U.S. PATENT DOCUMENTS 4,261,852  4/1981  Carroll et al. ...................... 521/159
4,701,476  10/1987  Bunchell et al. ................... 521/159

*Primary Examiner*—Maurice J. Welsh
*Attorney, Agent, or Firm*—Morgan & Finnegan

[57] ABSTRACT

Polyisocyanate compositions comprising:
(a) from 90 to 50% by weight of the reaction product between an organic diisocyanate and a polyether-polyol of functionality of at least 2, and wherein said reaction product has a content of free NCO radicals within the range of from 26.5 to 33% by weight; and
(b) from 10 to 50% by weight of polymethylene-polyphenyl-polyisocyanates.

9 Claims, No Drawings

POLYISOCYANATE COMPOSITIONS AND THEIR USE IN THE PREPARATION OF FLEXIBLE POLYURETHANE FOAMS

FIELD OF THE INVENTION

The present invention relates to polyisocyanate compositions and to their use in the preparation of flexible polyurethane foams.

BACKGROUND OF THE INVENTION

The preparation of polyurethane resins of either foamed or compact type by the reaction of organic polyisocyanates with polyether-polyols in the presence of suitable catalysts and additives is well-known from relevant technical literature.

In European patent application No. 10,850, a class of liquid polyisocyanates is disclosed, which is used, in particular, in the preparation of cold-aged flexible polyurethane resins, characterized by minimal surface defects.

Polyisocyanate compositions disclosed in this patent application are those which comprise:

A. from 90 to 50% by weight of the reaction product of diphenyl-methane-diisocyanate and a polyoxyalkylene polyol having an average functionality of from 2 to 3, and containing from 50 to 100% by weight of a polyoxypropylene diol or triol having an equivalent weight within the range of from 750 to 3000 and from 0 to 50% by weight of a polyoxyethylene-diol or triol having a molecular weight within the range of from 750 to 3000 and wherein the content of free NCO radicals, in said reaction product, is within the range of from 8 to 26% by weight; and B. from 10 to 50% by weight of a composition containing from 30 to 65% by weight of diphenyl-methane-diisocyanate and from 70 to 35% by weight of polymethylene-polyphenyl-polyisocyanates having a functionality higher than 2.

The above described polyisocyanate compositions are used as the isocyanate component in the production of polyurethanes by being reacted with organic polyols under conventional conditions or, more particularly, in the production of polyurethane foams in case during polycondensation suitable foaming agents are added to the reaction mixture.

However, the foams obtained from these compositions display very closed cell structures, so that further treatments—of the type of beating or of mangling—are required to break the cells of the foam and favor the escaping of the foaming gases remaining inside the interior of said cells.

DETAILED DESCRIPTION OF THE INVENTION

The present Applicant has found now that polyisocyanate compositions capable of yielding molded, flexible polyurethane foams with a very open cell structure, which hence do not require any successive mangling operations, are those which are obtained by starting from modified polyisocyanates having a content of free NCO radicals within the range of from 26.5 to 33% by weight.

Therefore, the object of the present invention is polyisocyanate compositions comprising:

(a) from 90 to 50% by weight of the reaction product between an organic diisocyanate and at least one polyether-polyol of functionality of at least 2, and wherein said reaction product has a content of free NCO radicals within the range of from 26 5 to 33% by weight; and from 10 to 50% by weight of mixtures of polymethylene-polyphenyl-polyisocyanates having the general formula:

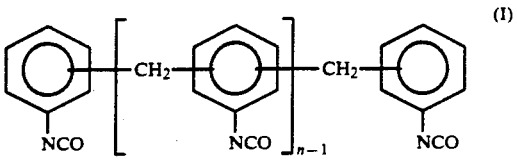

$$\text{(I)}$$

wherein n is an integer larger than, or equal to, 1.

More in particular, those polyisocyanate compositions are preferred, which comprise from 90 to 75% by weight of component (a) and from 10 to 25% by weight of component (b) and wherein the content of free NCO radicals of the (a) component is within the range of from 26.5 to 31%.

Any organic diisocyanates capable of yielding polyurethane foams can be used in the preparation of the (a) component of the composition according to the present invention, even if aromatic diisocyanates, cycloaliphatic diisocyanates and the corresponding alkyl-substituted derivatives thereof, are preferred.

In particular, low molecular weight diisocyanates of general formula:

$$\text{OCN—R—NCO} \quad \text{(II)}$$

wherein R represents a possibly alkyl-substituted cycloaliphatic or aromatic radical of from 5 to 25 carbon atoms, such as meta- and/or para-phenylene-diisocyanate, 2,4-toluene-diisocyanate, either alone or in mixture with its 2,6-toluene-diisocyanate isomer, 4,4'-diphenyl-methane-diisocyanate either alone or in mixture with its 2,4'-diphenyl-methane-diisocyanate isomer; 4,4'-di-cyclohexyl-methane-diisocyanate. 1-isocyanato-3-isocyanato-methyl-3,3,5-trimethyl-cyclohexane (isophorone-diisocyanate), and so forth, can be used.

The diisocyanate of general formula (II) whose use is preferred is 4,4'-diphenyl-methane-diisocyanate (MDI) either alone or in mixture with at least 5% by weight of its 2,4'-isomer.

The polyether-polyols used according to the present invention to obtain the modified polyisocyanates according to the above (a) item preferably have an either linear or a branched chain, have a molecular weight within the range of from 1000 to 8000, and are obtained from alkylene oxides, for instance $C_1$–$C_6$ alkylene oxide or, more in particular, from propylene oxide—possibly in mixture with not more than 50% by weight of ethylene oxide—in the presence or not of such crosslinking agents as glycerol, trimethylol-propane, pentaerythritol, and so forth.

The preferred polyether-polyol is polyoxy-propylene-glycol (PPG) having linear structure and a molecular weight of 2000.

The modified polyisocyanates according to above (a) item can be obtained at reaction temperatures within the range of from 50° to 100° C., and preferably within the range of from 60° to 80° C., and with weight ratios of the organic diisocyanate to the polyether-polyol such as to yield an end product with a content of NCO radicals within the hereinabove specified range.

The polymethylene-polyphenyl-polyisocyanates of general formula (I) are products known from the prior art, obtained by reaction of phosgene with aniline-formaldehyde condensates, and have an average functionality of from 2.6 to 2.8. Examples of such products are those available on the market under the tradenames "Tedimon 31" by Montedipe, "Suprasec DNR" by I.C.I. and "Desmodur 44 V 20" by Bayer.

The polyisocyanate compositions according to the present invention can be used to prepare polyurethane resins, in particular flexible foamed resins, by their reaction with polyether-polyols according to traditional techniques, known to those skilled in the art.

Techniques for producing flexible polyurethane foams are those described by Saunders and Frisch in "Polyurethanes, Chemistry and Technology", Interscience, New York (1964).

The polyurethane foams obtained by the polyisocyanate compositions according to the invention display, at the time of opening of the mold, a particularly open cell structure and therefore they do not require any successive treatments of mangling, or of pressing.

EXAMPLES

To better understand the present invention, and to practice it, following are illustrative, non-limitative examples.

EXAMPLE 1 COMPARATIVE EXAMPLE

A modified MDI was obtained by the reaction at 70° C. and for a 2-hour reaction time, of 59.2 parts by weight of an isomeric mixture of 4,4'-MDI and 2,4'-MDI in the ratio of 80/20, with 40.8 parts by weight of linear PPG with a molecular weight of 2000, up to an end content of free NCO of 18.2%.

53.8 parts by weight of polymethylene-polyphenyl-polyisocyanate (Tedimon 31) was added to this product, until an end composition was obtained, which contained 22.7% of free NCO (Isocyanate 1).

EXAMPLE 2 COMPARATIVE EXAMPLE

A modified MDI was obtained by the reaction at 70° C. and for a 2-hour reaction time, of 72.4 parts by weight of an isomeric mixture of 4,4'-MDI and 2,4'-MDI (in the ratio of 80/20), with 27.6 parts by weight of linear PPG with a molecular weight of 2000, up to an end content of free NCO of 23.2%.

53.8 parts by weight of polymethylene-polyphenyl-polyisocyanate (Tedimon 31) was then added to this intermediate product, until an end composition was obtained, which contained 25.8% of free NCO (Isocyanate 2).

EXAMPLE 3 COMPARATIVE EXAMPLE

A modified MDI was obtained by the reaction at 70° C. and for a 2-hour reaction time, of 79.8 parts by weight of an isomeric mixture of 4,4'-MDI and 2,4'-MDI (in the ratio of 80/20), with 20.2 parts by weight of linear PPG with a molecular weight of 2000, up to an end content of free NCO of 26.0%.

100 parts by weight of polymethylene-polyphenyl-polyisocyanate (Tedimon 31) was then added to this intermediate product, until an end composition was obtained, which contained 28.5% of free NCO (Isocyanate 3).

EXAMPLE 4

A modified MDI was obtained by the reaction at 70° C. and for a 2-hour reaction time, of 82.6 parts by weight of an isomeric mixture of 4,4'-MDI and 2,4'-MDI (in the ratio of 80/20), with 17.4 parts by weight of linear PPG with a molecular weight of 2000, up to an end content of free NCO of 27.0%.

44.5 parts by weight of polymethylene-polyphenyl-polyisocyanate (Tedimon 31) was then added to this intermediate product, until an end composition was obtained, which contained 28.2% of free NCO (Isocyanate 4).

EXAMPLE 5

A modified MDI was obtained by the reaction at 70° C. and for a 2-hour reaction time, of 85.1 parts by weight of an isomeric mixture of 4,4'-MDI and 2,4'-MDI (in the ratio of 80/20), with 14.9 parts by weight of linear PPG with a molecular weight of 2000, up to an end content of free NCO of 28.0%.

45.8 parts by weight of polymethylene-polyphenyl-polyisocyanate (Tedimon 31) was then added to this intermediate product, until an end composition was obtained, which contained 29% of free NCO (Isocyanate 5).

EXAMPLE 6

A modified MDI was obtained by the reaction at 70° C. and for a 2-hour reaction time, of 92 parts by weight of an isomeric mixture of 4,4'-MDI and 2,4'-MDI (in the ratio of 80/20), with 8 parts by weight of linear PPG with a molecular weight of 2000, up to an end content of free NCO of 30.6%.

49.5 parts by weight of polymethylene-polyphenyl-polyisocyanate (Tedimon 31) was then added to this intermediate product, until an end composition was obtained, which contained 30.7% of free NCO (Isocyanate 6).

EXAMPLE 7

The above compositions from 1 to 6 were used to produce foamed resins for car seats of standard geometry having a bulk density of 45 g/liter, by the reaction with a formulated polyol having the composition:

| | |
|---|---|
| polyoxypropyleneglycol/polyoxyethyleneglycol triol with molecular weight 6000 (1) | pbw 100 |
| $H_2O$ | pbw 3.1 |
| catalyst DABCO 33 LV (2) | pbw 0.9 |
| catalyst NIAX A1 (3) | pbw 0.3 |
| silicone KS 43 (4) | pbw 0.3 |
| CFC 11 (5) | pbw 12 |
| NCO Index | 100 |

(pbw = parts by weight)
The molding conditions were:
Temperature of the components: 22° C.
Temperature of the mold: 40° C.
Apparent bulk density of the foamed resin: 46 g/liter The observed performance data is reported in the following Table.

| | |
|---|---|
| (1) GLENDION FG 5963 | a MONTEDIPE product |
| (2) Catalyst DABCO 33 LV | an AIR PRODUCTS product |
| (3) Catalyst NIAX A1 | a U.C.C. product |
| (4) Silicone KS 43 | a BAYER product |
| (5) ALGOFRENE 11 | a MONTEFLUOS product |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The references are hereby incorporated by reference.

TABLE

| Property | Standard | Unit of measure | Isocyanates 1 | 2 | 3 | 4 | 5 | 6 |
|---|---|---|---|---|---|---|---|---|
| NCO content, 1st step | ASTM D 1638/74 | % by weight | 18.2 | 23.2 | 26.0 | 27.0 | 28.0 | 30.6 |
| Foaming tests: | | | | | | | | |
| *Cream time | ASTM 2237/70 | seconds | 8 | 8 | 7 | 7 | 7 | 8 |
| *Gel time | ASTM 2237/70 | seconds | 77 | 68 | 64 | 59 | 63 | 58 |
| *Tack free time | ASTM 2237/70 | seconds | 160 | 126 | 115 | 108 | 115 | 110 |
| *Cell structure | | visual evaluation | v.c. | v.c. | c. | v.o. | v.o. | v.o. |
| Production of car seats: | | | | | | | | |
| *Mangling required | | | yes | yes | yes | no | no | no | v.c. = very closed cell structure
c. = closed cell structure
v.o. = very open cell structure

We claim:

1. Polyisocyanate compositions comprising:
   (a) from 90 to 50% by weight of a reaction product between an organic diisocyanate and a polyether-polyol of functionality of at least 2, and wherein said reaction product has a content of free NCO radicals within the range of from 26.5 to 33% by weight; and
   (b) from 10 to 50% by weight of mixtures of polymethylene-polyphenyl-polyisocyanates having the general formula:

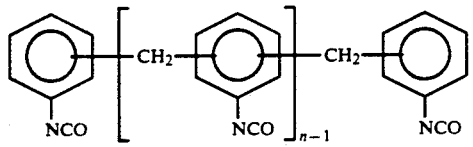

wherein n is an integer greater than, or equal to, 1.

2. Polyisocyanate compositions according to claim 1, comprising from 90 to 75% by weight of component (a) and from 10 to 25% by weight of component (b) and wherein the content of free NCO radicals of the (a) component is within the range of from 26.5 to 31%.

3. Polyisocyanate compositions according to claim 1, wherein the organic diisocyanate is selected from the group consisting of the aromatic and cycloaliphatic diisocyanates and the corresponding alkyl-substituted derivatives thereof.

4. Polyisocyanate compositions according to claim 3, wherein the organic diisocyanate is 4,4'-diphenylmethane-diisocyanate either alone or in mixture with at least 5% by weight of 2,4'-diphenylmethane-diisocyanate isomer.

5. Polyisocyanate compositions according to claim 1, wherein the polyether-polyol has an either linear or a branched chain, has a molecular weight within the range of from 1000 to 8000, and is obtained from ($C_1$-$C_6$)-alkylene oxides.

6. Polyisocyanate compositions according to claim 5, wherein the polyether-polyol is polyoxy-propylene-glycol with a linear structure and a molecular weight of 2000.

7. Polyisocyanate compositions according to claim 1, wherein the polymethylene-polyphenyl-polyisocyanates are obtained by reaction of phosgene with aniline-formaldehyde condensates, and have an average functionality of from 2.6 to 2.8.

8. In a method for the preparation of flexible polyurethane foams having a very open cell structure at the time of their extraction from the molds, and therefore not requiring any successive operations of mangling or of pressing the improvement wherein the polyisocyanate composition used in making said foams is a polyisocyanate composition according to claim 1.

9. A flexible polyurethane foam prepared in accordance with the method of claim 8.

* * * * *